April 22, 1958     J. F. HOWELL     2,831,980

DENSITY GAUGING METHOD AND APPARATUS

Filed May 25, 1953     2 Sheets-Sheet 1

CHARACTERISTIC RESPONSE CURVES FOR DETECTOR 16 AT VARIOUS EXCITING FIELD POTENTIAL VALUES

CHARACTERISTIC RESPONSE CURVES FOR DETECTOR 16' WITH VARIOUS INTERPOSED SCREEN THICKNESSES

INVENTOR:
JOHN F. HOWELL

BY: *Junius F. Cook, Jr.*

ATTORNEY

April 22, 1958     J. F. HOWELL     2,831,980
DENSITY GAUGING METHOD AND APPARATUS Filed May 25, 1953     2 Sheets-Sheet 2

INVENTOR:
JOHN F. HOWELL
BY:- *Junius F. Cook, Jr.*
ATTORNEY

United States Patent Office 2,831,980
Patented Apr. 22, 1958

2,831,980

DENSITY GAUGING METHOD AND APPARATUS

John F. Howell, Milwaukee, Wis., assignor to General Electric Company, a corporation of New York Application May 25, 1953, Serial No. 357,121

9 Claims. (Cl. 250—83.3)

The present invention relates in general to electronics, and has more particular reference to means for and method of determining the density of materials by measuring the intensity of penetrating rays passing through the material under observation.

Penetrating rays, such as X-rays and the like, may be employed for the inspection of objects to determine the thickness thereof or to measure the relative density of the constituent materials of which the object being examined is composed. Thickness and density measurement may thus be accomplished by scanning the object with a penetrating ray beam and measuring the intensity of the beam after the same has traversed the examination object.

The ability of X-rays to penetrate material depends not only upon the intensity of the rays, which is usually expressed in Roentgen units, but also upon the quality thereof, usually expressed in terms of wave length. Generally speaking, the shorter the wave length, the more penetrating are the rays.

In penetrating ray inspection for density or thickness determining purposes, a suitable source of penetrating rays may be employed to produce and direct a scanning beam through the object to be inspected and upon a sensitive ray detector, whereby to alter the electrical characteristics of the detector in proportion to or as a function of the quality and intensity of the ray where it impinges upon the detector, the variable internal condition of an object or objects under inspection, as determined by differences in density of the constituents of the object, being thus determined in terms of intensity and quality variation of the detector impinging ray as measured by changes in the electrical characteristics of the detector. The detector, in turn, may be interconnected in an electrical translation system adapted to operate in response to changes in the electrical characteristics of the detector, in order to manifest such changes in any desired fashion, as by causing the operation of an indicating meter or other signaling, recording, or warning devices, or other suitable equipment adapted for operation as and when the electrical characteristics of the detector show a predetermined density or thickness variation from a preselected value.

In such systems, especially where extreme precision is desirable, if not essential, to the satisfactory performance of the apparatus, it has heretofore been necessary to provide means for producing X-rays of substantially uniform quality and intensity for application to the examination object, so that false operation of the detector means and associated translation system, and of the operable device or devices actuated thereby, be not caused as the result of intensity or quality fluctuations in the inspecting ray as emitted from the ray source, as distinguished from intensity and quality changes imparted in the ray as the result of passage thereof through the object being inspected. Since electrically actuated ray generating tubes are commonly employed as ray sources for inspectional purposes, and since the intensity and quality of penetrating rays emitted by such generating tubes is a function of tube actuating voltage, it has heretofore been considered necessary to provide relatively expensive voltage regulating equipment for assuring operation of the generating tube to produce penetrating rays of substantially uniform quality and intensity for density gauging purposes.

An important object of the present invention is to provide relatively simple and inexpensive means for controlling the operation of a penetrating ray detector and associated translation system, so that the same may accomplish the precise detection of ray energy fluctuations or changes imparted in the ray as the result of passage thereof through an object under inspection, without regard to fluctuations in the intensity of the scanning ray at the ray source, produced by fluctuations in the actuating voltage of a ray generating tube forming the ray source.

Another important object is to provide density or thickness gauging means comprising a suitable source of penetrating rays, a pair of detectors disposed in position to receive impingement of rays from said source, the one through an object being gauged, tested or inspected, and the other through a standard or calibration screen, and electrical translation means operatively connected with said detectors for determining the density of the examination object or sample in terms of the differential response of said detectors.

Another important object is to load the detectors each on a corresponding signal translation system, the systems being substantially identical and connected differentially to drive a common load device, such as a meter or like responsive means for indicating, recording or otherwise responding to the measured density of the examination object.

Another important object is to utilize a pair of ray sensitive detectors having appreciably different response characteristics, and to match the response characteristics exactly in the translation systems by adjustably screening one of the detectors and by adjusting the operating or field voltage applied to at least one of the detectors, until the response of each to rays from the common ray source is substantially identical throughout the entire intensity range.

Another important object of the invention is to employ ray sensitive detectors comprising semi-conductor material, such as cadmium or mercury sulphide or cadmium selenide, the same being electron donor semi-conductors exceedingly sensitive to energy intensity variations in penetrating rays impinging thereon, and being hence particularly well suited for employment in the density gauging system of the present invention.

Another important object of the invention is to provide density gauging equipment comprising a suitable source of penetrating rays, such as X-rays, and a pair of substantially identical ray sensitive detectors spaced from the source in position, the one to receive rays through an object to be gauged for the determination of its density, and the other to receive rays directly from the source, through a calibrating filter if desired, the equipment including separately adjustable translation systems each respectively driven by a corresponding one of said detectors, whereby the response characteristics of the detectors may be equalized within the intensity range of penetrating rays applied thereto from said source, said translation systems being differentially interconnected for the operation of a load device.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 1:
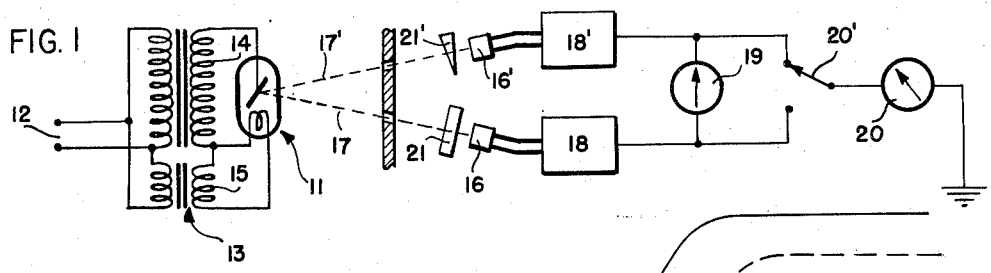
Fig. 1 is a diagrammatic representation of a density gauging system embodying the present invention.

To illustrate the invention, the drawings show apparatus for gauging the density of an examination object by applying a penetrating ray beam therethrough and measuring the loss of quality or intensity of the beam in passing through the scanned object, the density of the object being determined by measuring such ray intensity loss. To these ends, the density gauging equipment comprises a suitable penetrating ray source 11, which may conveniently comprise an X-ray tube having a cathode and a cooperating anode adapted to form a source of X-rays when energized by the impingement thereon of electrons emitted by the cathode.

The X-ray tube may be electrically energized by operation of electrical power delivered from a suitable power source 12, through any preferred or conventional power supply system, which may comprise transformer means 13, including windings 14 connected for the application of electrical potential for electron driving purposes between the anode and cathode of the tube, and windings 15 connected with the cathode of the tube to excite the same for electron emission. It should, of course be understood that an X-ray generating tube operates to constitute the anode thereof as an X-ray source in response to impingement thereon of electrons emitted at the cathode and driven thence upon the anode under the influence of electrical potential applied between the cathode and the anode.

The tube operating potential applied between the anode and cathode of the tube may be of alternating character of the sort supplied through the transformer windings 14 from a suitable alternating power source 12. X-ray tubes have inherent rectifying characteristics in that ray generating electron flow between cathode and anode may occur in only one direction. As a consequence, when in operation with alternating potential applied between anode and cathode, an X-ray generating tube will function as a half wave rectifier, and consequently will allow impingement of ray generating electrons upon the anode of the tube only during the positive half cycle periods of the electron driving anode-cathode potential. Accordingly, the generated rays will be produced in pulses corresponding with the half cycle values of applied anode-cathode potential.

In addition to the penetrating ray source 11 and means for energizing the same to function as such, the density gauging equipment comprises a pair of ray sensitive detectors 16 and 16' disposed in position exposed respectively to rays 17 and 17' emanating from the ray source. The detectors 16 and 16' are controllingly connected each in a corresponding translation systm 18, 18', said systems being differentially interconnected for the operation of a load device 19, such as an indicating meter. If desired, additional metering means 20 may be provided for separately measuring the signals delivered in the translation systems 18 and 18', including switch means 20' for selectively connecting the meter 20 at will with either of the signal translation systems.

The translation systems 18 and 18', including the ray sensitive detectors 16 and 16', may be adjusted and calibrated so as to normally transmit substantially identical signals when the ray source 11 is in operation. Under such conditions the load device 19 will remain inactive. Said device 19 preferably comprises an indicating meter deflectable in either direction from a medial zero index position in response to the difference, if any, in the intensity of the signals delivered by the translation systems 18 and 18'. By disposing an article 21 to be gauged in the path of penetrating rays between the ray source and one of the detectors, the absorption of penetrating rays by the article, the same being precisely proportional to the density thereof, will be accurately measurable as the differential output of the translation systems 18 and 18', such differential output being indicated by the meter 19.

The density indicating deflection of the meter 19 will, of course, take place in one direction or the other depending upon which of the detectors is screened by the article 21. As shown in Fig. 1 of the drawings, the article 21 is disposed in the path of the penetrating ray 17 in position screening the detector 16, an adjustable calibrating wedge 21' being shown in like relative position with respect to the detector 16', in the path of the ray 17'. The wedge 21' may be employed in calibrating the translation systems and associated detectors for the establishment of normal or zero indicating condition as measured by the meter 19. Such condition, by means of the wedge 21', may be established for a selected density of the examination article 21, thereby affording means for continuously testing the density of an article 21 presented, for example, in the form of a strip of material fed continuously across the ray beam 17 in position screening the detector 16 from the source 11.

Density of an article is, of course, a function of its thickness. Accordingly, thickness variations in the striplike article in either direction from a predetermined value for which the equipment may be calibrated, will be shown by the meter 19 or by operation of some other suitable substitute load device, the meter 19 deflecting in one direction or the other from its central zero position in response to greater or lesser thickness of the article 21 at the point thereof presented in the beam 17, as compared with the selected value for which the equipment is calibrated.

It will be seen from the foregoing that the determination of density in accordance with the present invention resides in providing substantially duplicate translation systems including system controlling ray sensitive detectors, and in calibrating the systems for substantially equal response to radiation applied on the detectors 16 and 16' under normal or zero conditions, so that, by disturbing such normal conditions of irradiation to an extent proportional to the density of an article to be gauged, such density may be determined in terms of the differential output of said substantially identical systems. Under the circumstances, the translation systems 18 and 18' are each the substantially identical duplicate of the other, and every effort is made to provide ray sensitive detectors 16 and 16' having substantially identical ray response characteristics.

A ray sensitive detector may comprise any suitable substance adapted to change a measurable characteristic in response to the application thereon of rays to which the detector is sensitive. So-called semi-conductor materials have electrical resistance or reactance characteristics, or both resistance and reactance, which vary in accordance with the intensity of light or other rays to which the substance is exposed. Accordingly, semi-conductors may be employed as ray sensitive detectors. Electrical resistance and reactance, either inductive or capacity reactance, or both, are the characteristics of electrical conductors which tend to prevent or impede the flow of electrical current therethrough under the influence of a driving electromotive force, the combined current flow resistive effect of the resistance and reactance of a given conductor material being commonly referred to as the electrical impedance of the material.

In the absence of rays to which it responds, a semi-conductor may have impedance characteristics of such high order as to constitute it as an insulator capable of substantially preventing flow of electrical power therethrough. When irradiated with rays to which it is responsive, the impedance of a semi-conductor material may be reduced as a proportional function of incident ray intensity, the material thus becoming electrically conducting in proportion to the intensity of rays impinging thereon. The ability of a semi-conductor material thus to alter its impedance in response to the intensity of incident irradiation is employed in the present invention to determine the density of an examination object, through which penetrating rays are caused to pass and to impinge upon a suitable ray sensitive detector.

To this end, the present invention contemplates the employment of detectors 16 and 16' comprising ray sensitive semi-conductor material having the ability to change the electrical impedance of the material in proportion to the intensity of rays impinging thereon. Preferably, the detectors 16 and 16' each comprise crystalline, ray sensitive semi-conductor material, such as cadmium or mercury sulphide, or cadmium selenide, the same being usefully sensitive to X-rays and like penetrating ray emanations. In the absence of X-rays, the named substances have electrical impedance characteristics of such high order as to constitute the same as virtual insulators. The impedance of the named materials, however, progressively declines in proportion to the intensity of incident X-rays impinging thereon. As more fully explained in U. S. Letters Patents Nos. 2,706,790, 2,706,791 and 2,706,792, which issued in response to co-pending applications for U. S. Letters Patent Serial No. 190,801, filed October 18, 1950, Serial No. 232,073, filed June 18, 1951, and Serial No. 441,873, filed July 7, 1954, now Patent No. 2,706,792, as a division of Serial No. 228,333 (abandoned), filed May 25, 1951, the intensity of X-rays impinging upon the named substances may be accurately measured in terms of the apparent impedance of the detecting material.

The named semi-conductors may also be distinguished from commonly known semi-conductors in that they exhibit current amplifying characteristics when irradiated with X-rays. Semi-conductors operate as such through the release of electrons, entrapped therein, when subjected to energy rays to which sensitive. Commonly known semi-conductors, such as selenium, none of which are to any appreciable or useful extent sensitive to penetrating rays, such as X-rays, operate to release electrons in direct proportion to changes in the electrical space charge of the material, as the result of ray impingement thereon, and thus do not show current amplifying characteristics. The sulphides of cadmium and mercury, however, as well as the selenide of cadmium, release many thousands or hundreds of thousands of electrons in response to unit alteration of the space charge therein, when excited by penetrating rays, including X-rays, to which said materials are sensitive. The sensitive element 16 thus, in effect, comprises a tiny amplifier capable of delivering a substantial quantity of electrical current when excited by X-rays.

It is thought that the amplifying character of the crystals is due to the fact that cadmium and mercury sulphide and cadmium selenide comprise what may be called excess electron or electron donor semi-conductors, the excess energy necessary to produce amplified currents in the crystal being derived from the electron producing character of the material itself, when irradiated or triggered by exposure to X-rays. It is suggested that electron donor centers in each crystal become ionized by the impinging X-rays, thus forming stationary positive space charges in the material. The amplifying character of these electron donor materials can be compared to that of a conventional triode tube where the grid is assumed to be floating. In such a tube the grid takes up a negative charge as the result of electron flow therein, thus reducing the plate current to a small value. If the grid of such a tube is charged positively, the current flow therein will materially increase. In electron donor type of crystal material, the conduction electrons are, to a large extent, localized in traps, thus forming a current-reducing, stationary, negative space charge. Upon ray impingement on the crystal, its electron donor centers become ionized, thus assuming positive charges. These stationary positive charges are thought to act in the same way as do positive charges on the grid of a triode tube. One positive hole, or center, so established in the crystal, appears to control the flow of more than ten thousand electrons in the crystal. This is in contradistinction to the action of ordinary photo-sensitive conductors, such as selenium, where this amplification mechanism is absent. As a consequence, electrical energy is released in the electron donor type of crystal material in the form of crystal current that is many times the energy applied to the crystal by the exciting ray, the action being such as to render these electron donor semi-conductors detectably sensitive to X-rays.

X-ray sensitive crystals of cadmium and mercury sulphide and of cadmium selenide may be grown in the form of hexagonal prisims by vapor phase procedures. Such a crystal may be electrically connected at its opposite ends with suitable conductors, as by coating the opposite ends of the crystal each with a layer or plate of electrical conducting material with which the conductors may be electrically joined, and the present invention utilizes the ray sensitive semi-conducting and amplifying characteristics of the crystal elements forming the ray detectors 16 and 16' for differentiating the intensity of rays reaching one of the detectors through the examination object, with respect to the intensity of rays reaching the other detector element without passing through the examination object.

This is accomplished by providing for continuously measuring the apparent impedance of both detectors, as by the application thereon of a field voltage of uniform value and the measurement of resulting current flow in the detector, and by controlling the translation systems 18 and 18' respectively for the transfer and application on the load device 19 of signaling impulses of intensity corresponding with the so measured impedance characteristics of the detectors 16 and 16'. The device 19 is thus caused to operate in accordance with the differential of the measured impedance of the detectors which may represent the density of the examination object, where the detectors and translation systems are suitably calibrated as hereinafter more fully explained.

Figure 2:
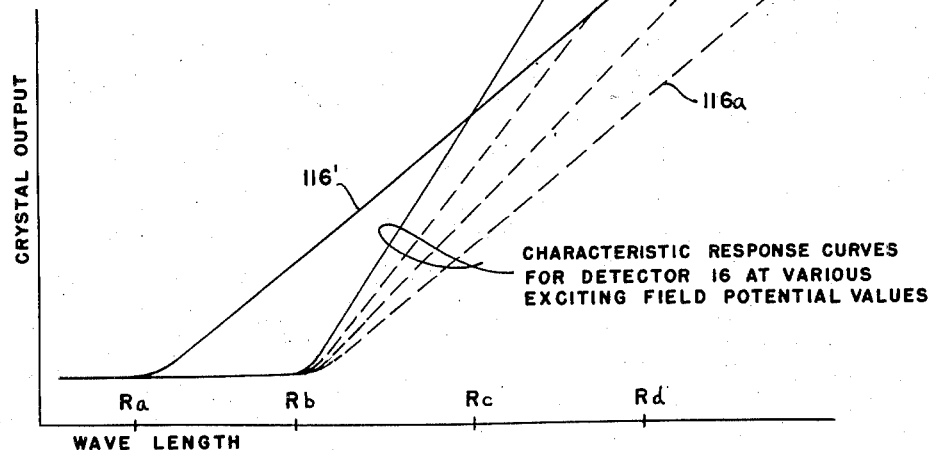
Figs. 2 and 3 are graphical representations of the performance characteristics of detectors forming a part of the system shown in Fig. 1.

Ray sensitive detectors respond to X-rays in the manner graphically illustrated in Fig. 2, showing typical cyma curve relationships between the extent of ray excitation of the detectors and the response thereof to such excitation. It will be understood, of course, that each individual crystal detector may have its own individual response characteristics, which may vary from the corresponding response characteristics of other crystals of identical material. The response variation between detectors, however, is not a matter of difference in the shape of the typical cyma response curve, but rather a difference in the degree of response at various quality or intensity levels of ray excitation. As shown more particularly in Fig. 2, the ray sensitive crystal 16', represented by the curve 116', may become initially responsive at a relatively lower wave length $B_a$ than the wave length $R_b$ at which the other detector 16, represented by the curve 116, becomes initially responsive. The response of the detector 16', as illustrated by the curve 116', may taper off and become stable at a value considerably lower than that at which the other detector 16 becomes stabilized, as illustrated by the curve 116.

It will be seen that, if the detectors 16 and 16' have identical response characteristics, the operable device 19 will at all times respond exactly in proportion to the density of the examination object 21, and this will be true for all values of wave length, as a measure of ray quality, throughout the response range of the detectors 16 and 16'. If, however, detectors having response characteristics of the sort illustrated respectively by the curves 116 and 116' in Fig. 2 are employed in the system, it will be seen that the response of the device 19 will correspond with the differential of the responses of the detectors only when the quality of applied rays 17 and 17' is that produced at the wave length value $R_c$ at which the curves 116 and 116' intersect.

As a practical matter, it is virtually impossible to obtain a pair of perfectly matched crystals having identical response characteristics, the expense of testing and sorting crystals to obtain matched pairs being prohibitively high.

The sensitivity of a ray detecting crystal, however, can be adjusted merely by varying the intensity of the field voltage applied thereto for impedance measuring purposes. By thus varying the field voltage, a family of response curves may be obtained for a detector, the curve 116 and the adjacent curves shown in dotted lines in Fig. 2 comprising a family of response curves illustrating the characteristics of a detector, such as the detector 16, operated under the influence of applied field voltages of various intensity.

It will be noted that one of said dotted line curves 116a has an inclination and a tapered-off value matching the inclination and tapered-off value of the curve 116. The detector 16, accordingly, may be matched with the detector 16' to the extent illustrated by the curves 116' and 116a, merely by adjusting the field voltages applied to the crystal detectors. The response curve of either crystal may thus be adjusted with respect to that of the other crystal, or the response curves of both crystals may be adjusted.

It will be seen that the curves 116' and 116a are matched except that the response of one detector element with respect to the other is accomplished at relatively shorter wave length values than that at which the corresponding response of the other element is produced. Density gauging may, therefore, be accomplished with detectors 16 and 16' matched in the manner shown by curves 116' and 116a in Fig. 2, providing the differential output of the detectors, which is represented by the distance between the curves 116' and 116a measured vertically, is discounted, or the meters 19 and 20 otherwise adjusted or calibrated to take the output differential into account, since the meters otherwise would measure the output differential between the curves 116' and 116a together with the density gauging differential.

It is, however, an exceedingly simple matter to discount or compensate for the output differential between the curves 116' and 116a by utilizing a wedge screen, like the screen 21', in the path of penetrating rays to either of the detectors 16 or 16', although the screen 21' is preferably interposed in the path of the ray beam 17' which irradiates the detector 16'.

The wedge screen 21', by adjustment in a direction transversely of the penetrating ray beam, to thus interpose greater or lesser screen thickness in the path of the beam, may correspondingly vary the intensity of ray impingement upon the screened detector in proportion to the interposed screen thickness. By interposing progressively larger screen thickness in the path of penetrating rays applied on the detector 16', the position of its characteristic curve 116' will, as shown in dotted lines in Fig. 3 of the drawings, be shifted horizontally in the direction of shorter wave length; that is to say, the response of the detector element 16' is a function of interposed screen thickness in that the greater the interposed screen thickness, the shorter is the wave length of rays, emitted by the source 11, required to produce a selected response of the detector, wave length being a measure of the penetrating ability of the emitted rays.

Figure 3:
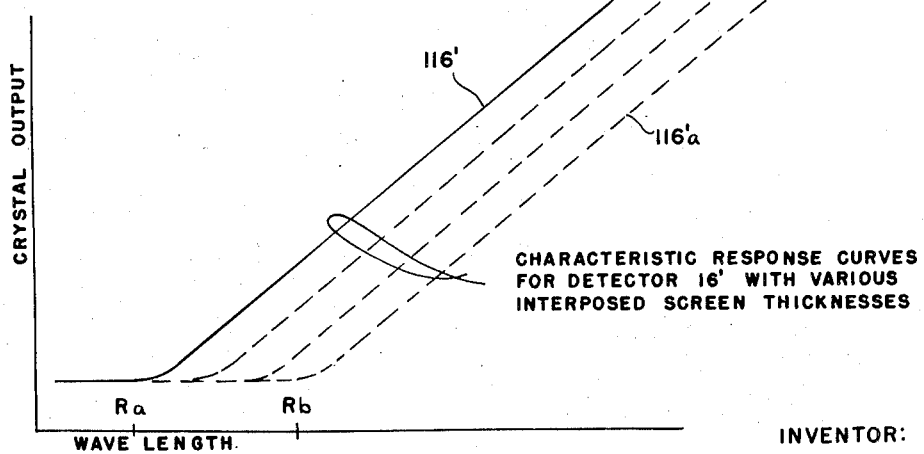

As shown in Fig. 3, a family of response curves will be produced by measuring the detector response to rays of various wave length emitted by the source 11 throughout the operating range of the crystal, with various interposed screen thicknesses. Such family of curves will include a response curve 116'a which will exactly coincide with and match the curve 116a. It is thus possible to calibrate the detectors 16 and 16' so that there is only barely perceptible displacement of the meter 19 with a variation in the intensity of rays as emitted from the source 11 from zero to a maximum.

Any suitable or preferred means may be employed for continuously determining the impedance characteristics of the detector elements 16 and 16', and for operating the responsive device 19. To this end, the translation systems 18 and 18' may each comprise substantially identical elements, including a pair of electron flow amplifiers 29, 30, and 29', 30', interconnected in tandem relationship and operable in response to predetermined change in the impedance value respectively of the detector devices 16 and 16' to actuate the differentially driven device 19 in response to such changes.

Each translation system may be electrically energized from suitable power supply conductors 31, 31' and 32, 32', the conductors 31, 31' preferably carrying relatively high positive potential of the order of 250 volts, the conductors 32, 32' preferably carrying negative potential of the order of 150 volts, grounded or return conductor means 33, 33' being also provided to facilitate the construction of the translation system.

The amplifiers 29, 30 and 29', 30' may each comprise an anode, a cathode, a control grid 34, 34', and a pair of screen grids 35, 36 and 35', 36', the cathodes of the amplifiers being connected with the screen grids 36, 36' and to ground through resistance elements 27, 27' and condensers 28, 28' connected in parallel relation each with a corresponding resistance element 27, 27'. The screen grids 35, 35' may be connected each with its corresponding power bus 31, 31' through a corresponding voltage control resistor 37, 37', and each of said grids may be connected to ground through a corresponding gaseous diode 38, 38', for determining the operating voltages upon the screen grids 35, 35'.

The anodes of the amplifiers 29, 29' may each be connected with the positive voltage bus 31, 31', respectively through the primary windings of corresponding coupling transformers 39, 39', or other suitable means for applying the output energy of the amplifiers 29, 29' upon the grids 34, 34' of the amplifiers 30, 30'. One side of each of the detector elements 16, 16' may be connected to ground through condenser means 41, 41' and with the power supply conductor 31, 31' through suitable, preferably adjustable, resistance means 40, 40'. The other side of each detector element 16, 16' may be connected respectively with the control grids 34, 34' of the amplifiers 29, 29', whereby the same may be constituted as means for continuously measuring the impedance of the detector elements in terms of electrical energy delivered upon the control grids 34, 34' of the amplifiers 30, 30', by way of the coupling means 39, 39'. To these ends, the sides of the detectors 16, 16', which are remote from the power supply buses 31, 31', are preferably connected respectively with the control grids 34, 34' of the amplifiers 29, 29', through one or more condensers 42, 43, and 42', 43', whereby to operate the amplifiers 29, 29', respectively, only in response to the fluctuating component of impedance measuring current produced in the detectors 16, 16'.

In this connection, it should be understood that the impedance measuring current flow in the detector elements 16, 16' may include a fluctuating component as well as a uni-directional component imparted by the action of the field voltages applied upon the detector elements from the conductors 31, 31', said fluctuating component corresponding with the energy fluctuations of the X-ray beam where the same is the product of a conventional X-ray generating tube energized by the application of alternating potential between the anode and the cathode of the tube. Where the ray source 11 is of a sort producing rays of a uniform, non-fluctuating intensity, there will, of course, be no fluctuating component in impedance measuring currents which flow in the detector elements 16, 16', and other translation means than the condensers 42, 42' and 43, 43' will have to be provided for applying impedance measuring energy upon the control grids of the amplifiers 29, 29'.

As explained in the aforesaid co-pending applications for U. S. Letters Patent Serial No. 190,801 and Serial No. 232,073, high speed ray detection response of the inspection equipment may be accomplished by utilizing only the fluctuating component of impedance measuring current in the detector element, the response of the element in terms of the uni-directional impedance measuring current component being relatively slow. As a consequence, for high speed scanning purposes requiring substantially instantaneous response, it is desirable to utilize penetrating rays of the sort produced by an X-ray generating tube energized for operation by application of alternating potential between the anode and cathode of the tube, such rays comprising energy emanations of cyclically fluctuating intensity, and to employ only the corresponding fluctuating component of electrical energy in the detectors 16, 16' for actuating the translation systems 18 and 18'.

For certain slow speed inspectional purposes it may be possible to employ the uni-directional component of electrical energy, in the detector circuits, either alone or in combination with the fluctuating component, by eliminating the condensers 42, 42' and 43, 43', and by replacing the same with other transfer means, including, if desired, suitable filter means for excluding the fluctuating energy component of detector current from the control grids 34, 34' of the amplifiers 29, 29', while passing to said control grids either the uni-directional component only, or the combined fluctuating and uni-directional components. Such arrangement, however, would materially reduce the response speed of the gauging equipment and hence is undesirable for high speed gauging purposes.

As shown, control resistors 44, 44', 45, 45', and 46, 46' may be employed for connecting the detector circuit to ground, the resistors 44, 44' being connected between the detectors 16, 16' and ground preferably through normally closed test jack switches 47, 47', said resistors 44, 44' preferably comprising potentiometers having adjustable elements connected with the condensers 42, 42'. The resistors 45, 45' respectively are connected at one end between the conductors 42, 42' and 43, 43', the other ends of the resistors 45 being connected with the ground conductors 33, 33'. The resistors 46, 46' respectively are connected at one end between the condensers 43, 43' and the control grids 34, 34' of the amplifiers 29, 29', the other ends of the resistors 46, 46' being connected to ground.

The energy output of the amplifiers 29, 29' may be applied in a suitable or preferred fashion to the control grids 34, 34' of the amplifiers 30, 30'. As shown, one side of the secondary windings of the coupling transformers 39, 39' may be connected to ground, the other side of said windings being connected respectively with the control grids 34, 34' of the amplifiers 30, 30' through corresponding resistors 49, 49', condensers 50, 50' being interconnected respectively between ground and the grid remote ends of the resistors 49, 49'. The control grids 34, 34' of the amplifiers 30, 30' may also be connected to ground each through a corresponding control tube 51, 51', having cathodes connected respectively with the control grids 34, 34', and anodes connected to ground.

The energy output of the amplifiers 30, 30' may be applied in any preferred manner for the differential control of the device 19. As shown, the outputs of the amplifiers 30, 30' may be applied each through a corresponding cathode follower tube 52, 52' and relay tubes for the operation of the devices 19 and 20. To these ends, the anodes of the amplifiers 30, 30' may be interconnected respectively with the control grids 34, 34' thereof, each through a corresponding condenser 53, 53'; and the anodes of said amplifiers 30, 30' may be respectively interconnected with the control grids of the cathode follower tubes 52, 52' by means of condensers 54, 54' and a wave form controlling network 55, 55'.

The networks 55, 55' may comprise conduction diodes 56, 56' and resistors 57, 57' interconnected in parallel relationship between the grids of the tubes 52, 52' and connection points 58, 58'. The cathodes of the diodes 56, 56', as shown, are preferably connected respectively with the connection points 58, 58', which in turn are connected with the ground conductors 33, 33' through resistors 59, 59', and with the power conductors 31, 31' through resistors 60, 60'. The networks 55 and 55' aid in maintaining the true shape of the non-symmetrical wave transferred from the amplifiers to the cathode follower tubes 52, 52'.

The cathode follower tubes may be interconnected with the devices 19 and 20 through a suitable network, which may serve to differentiate the energy delivered by the tubes 52, 52' and to apply the same upon the device 19, which will consequently function in accordance with the differential response of the detector elements 16, 16'.

Figure 4:
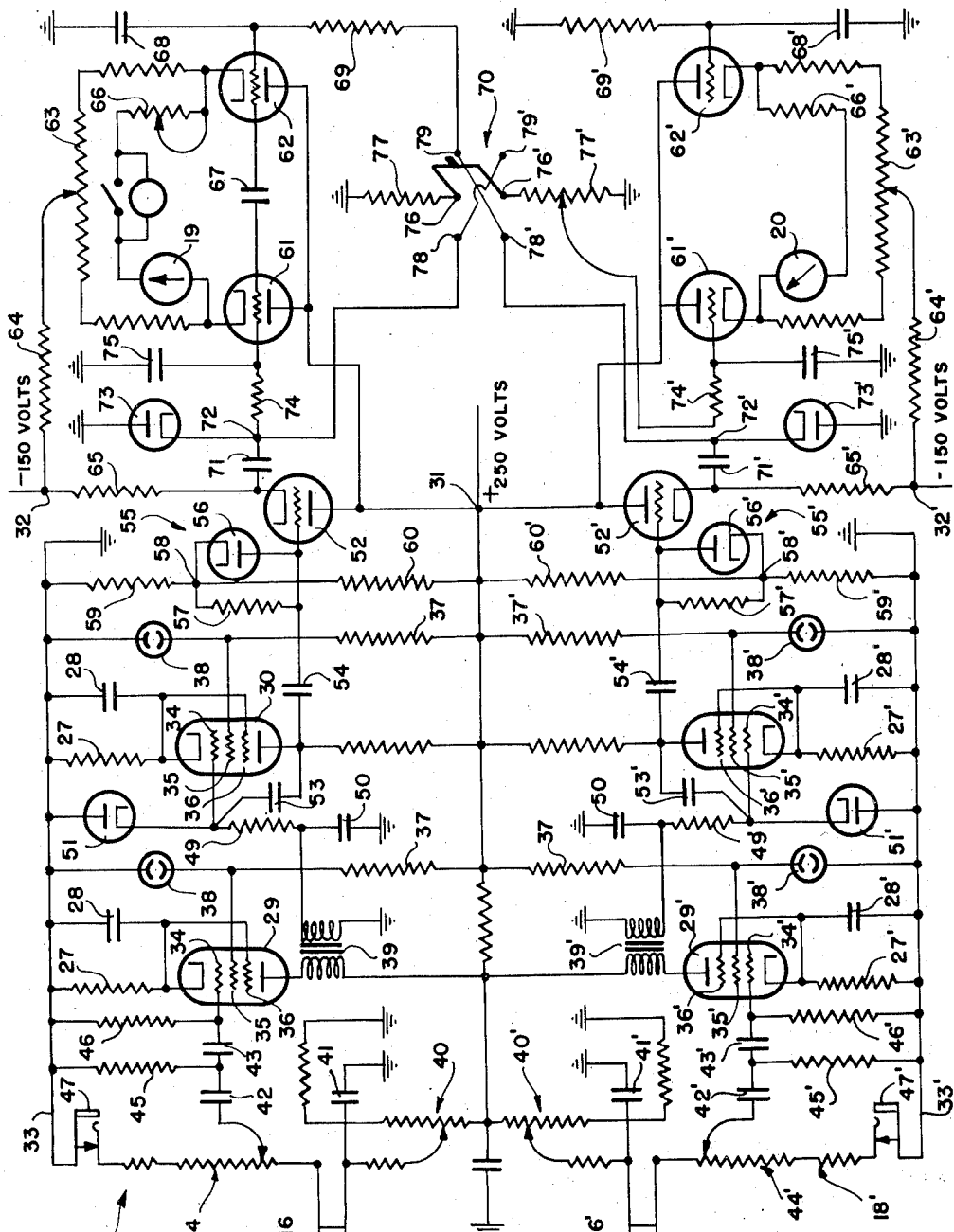
Fig. 4 is a diagrammatic view showing portions of the system illustrated in Fig. 1.

Alternately, the network may be conditioned to connect either of the tubes 52, 52' with the sensitive device 20. This is accomplished, as shown more particularly in Fig. 4 of the drawings, by providing a pair of three-element electron flow valves 61 and 62 for operating the device 19, and a corresponding pair of electron flow valves 61', 62' for actuating the device 20. The plates or anodes of the valves 61, 61', 62 and 62' are electrically connected with the power conductor means 31, 31'. The cathodes of the valves 61, 61' are electrically interconnected respectively with the cathodes of the valves 62, 62' through resistance means, including potentiometers 63, 63' having adjustable taps electrically connected respectively through resistors 64, 64' with the power conductor means 32, 32', said conductor means 32, 32' being also connected respectively through resistors 65, 65' with the cathodes of the follower tubes 52, 52'.

The responsive device 19 is electrically interconnected between the cathodes of the valves 61 and 62 in series with an adjustable resistor 66. The responsive device 20 likewise is electrically connected between the cathodes of the valves 61' and 62' in series with a resistor 66'. The control grids of the tubes 61 and 62 are electrically interconnected through a condenser 67, the grids of the tubes 61' and 62' being electrically separated the one from the other. The grids of the tubes 62, 62' may be electrically connected to ground, each through a corresponding condenser 68, 68'. Said grids may also be connected to ground through resistors 69, 69'. As shown, the grid of the tube 62' may be connected directly to ground through the resistor 69', while the grid of the tube 62 may be connected to ground through the resistor 69 and switching means 70 in manner hereinafter more fully disclosed.

The cathodes of the follower tubes 52, 52' may be interconnected through condensers 71, 71' with corresponding connection points 72, 72', and said connection points may each be connected to ground through corresponding diode devices 73, 73'. The connection points 72, 72' also may respectively be connected with the control grids of the valves 61, 61' through resistors 74, 74', the point 72 being directly connected with the grid of its associated valve 61, while the connection point 72' may be connected with the grid of its associated valve 61' through the resistor 74' and the switching means 70. The grids of the valves 61 and 61' may be connected with ground respectively through condensers 75 and 75'.

The switching means 70, as shown, may comprise a double pole, double throw selector switch having movable blades 76, 76' connected to ground respectively through resistance means 77, 77', the means 77' preferably comprising a potentiometer having an adjustable contact element electrically connected with the side of the resistor 74' which is remote from the grid of the tube 61'. The selector switch has a pair of stationary contacts 78 and 79 adapted alternately and selectively to be connected with the movable contact 76, and another pair of stationary contacts 78' and 79' adapted alternately and selectively to be connected with the movable contact 76'. The stationary contacts 78 and 78' respectively are electrically connected with the stationary contacts 79' and 79. The interconnected stationary contacts 78 and 79' are electrically connected with the connection point 72. The interconnected stationary contacts 78' and 79 are electrically connected with the connection point 72'. The stationary switch contacts 78' and 79, also, are connected through the resistor 69 to the grid of the tube 62.

When the movable contacts 76, 76' are electrically connected with the stationary contacts 78, 78', it will be seen that the connection points 72 and 72' will be connected respectively to ground through the resistors 77 and 77', but that the grid of the valve 61', through the adjustable potentiometer 77', will be operatively connected with the tube 52' through the condenser 71' and the connection point 72'. The system, accordingly, will serve to operate the device 20 in accordance with the measured response of the detector 16' when the switch contacts 76, 76' respectively are electrically connected with the stationary contacts 78, 78'. The device 19, however, will show the differential of the measured responses of the detectors 16 and 16'.

By connecting the movable switch contacts 76, 76' with the stationary contacts 79, 79', it will be seen that the connection point 72' will be connected to ground through the resistor 77, while the connection point 72 will be grounded through the potentiometer 77' and will also be operatively connected with the grid of the valve 61', thereby drivingly connecting the tube 62 with the grid of the valve 61' whereby to cause the device 20 to operate in accordance with the measured response of the detector 16. The device 19, however, will show the differential of the measured responses of the detectors 16 and 16'.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The method of density gauging the material of a test object by the application of penetrating rays from a common ray source upon a pair of ray sensitive detectors having appreciably different ray response characteristics, while screening through the test object the rays applied on one of the detectors, which consists in differentially screening the rays applied on said detectors to equalize the response thereof at a selected value of source emitted ray intensity, and measuring the impedance of said detectors by the application thereto of field voltages adjusted to equalize the ray intensity response of the detectors, substantially throughout the ray responsive impedance variation range thereof, to thereby allow for the determination of density directly in terms of the differential of the measured impedance values of said detectors.

2. Apparatus for density gauging the material of a test object comprising a pair of ray sensitive crystalline detector elements of the sort showing impedance characteristics variable as a proportional function of the intensity of impinging rays, said elements having appreciably different ray response characteristics and being disposed in position the one to receive penetrating rays from a ray source after being screened through the test object, and the other to receive rays from said source unscreened by said test object, adjustable means for differentially screening the rays applied on said detectors in order to equalize the response thereof at a selected value of source emitted ray intensity measuring, means for determining the impedance of said detectors comprising adjustable means for applying field voltages of selected value to said detectors, to thereby equalize the response thereof, per unit change in the intensity of rays impinging thereon, substantially throughout the ray responsive impedance range thereof, and density indicating means actuated by said measuring means in response to the differential value of the measured impedance of said detectors.

3. Apparatus for density gauging the material of a test object comprising a pair of ray sensitive detector elements disposed in position the one to receive penetrating rays from a suitable ray source after being screened through the test object, and the other in position to receive rays from said source unscreened by said test object, measuring means for determining the impedance of said detectors, a translation system including an electron flow valve operatively associated with each detector, means to operate each of said translation systems in accordance with the measured impedance of its corresponding detector, a density responsive gauge, an impedance responsive gauge, and selectively operable means for actuating the density responsive gauge differentially by said translation systems and to operate the impedance responsive gauge selectively by each of said translation systems.

4. Apparatus for density gauging the material of a test object comprising a pair of ray sensitive detector elements disposed in position the one to receive penetrating rays from a suitable ray source after being screened through the test object, and the other in position to receive rays from said source unscreened by said test object, measuring means for determining the impedance of said detectors, including means for applying potential fields of unlike value upon said detectors, a translation system including an electron flow valve operatively associated with each detector, for operation in accordance with the measured impedance of its corresponding detector, and metering means differentially driven by both of said translation systems.

5. Apparatus for density gauging the material of a test object comprising a pair of ray sensitive detector elements disposed in position the one to receive penetrating rays from a suitable ray source after being screened through the test object, and the other in position to receive rays from said source unscreened by said test object, measuring means for determining the impedance of said detectors, including means for applying potential fields of unlike value upon said detectors, a translation system including an electron flow valve operatively associated with each detector, for operation in accordance with the measured impedance of its corresponding detector, and metering means selectively driven by said systems.

6. Apparatus for density gauging the material of a test object comprising a pair of ray sensitive detector elements disposed in position the one to receive penetrating rays from a suitable ray source after being screened through the test object, and the other in position to receive rays from said source unscreened by said test object, measuring means for determining the impedance of said detectors, including separate bias means for applying potential fields of desired value upon each of said detectors, at least one of such bias means being adjustable to vary the potential field applied on one of said detectors, whereby to match a ray response characteristic thereof with that of the other detector, a translation system including an electron flow valve operatively associated with each detector for operation in accordance with the measured impedance of its corresponding detector, and metering means driven by said systems.

7. Apparatus for density gauging the material of a test object comprising a pair of ray sensitive detector elements disposed in position the one to receive penetrating rays from a suitable ray source after being screened through the test object, and the other in position to receive rays from said source unscreened by said test object, measuring means for determining the impedance of said detectors, a translation system including an electron flow valve operatively associated with each detector, means to operate each of said translation systems in accordance with the measured impedance of its corresponding detector, an indicator and selectively operable means for connecting the same for response to signals delivered through one or other of said translation systems and for disconnecting the indicator from both systems, a density responsive gauge, and means operatively associated with said selectively operable means for connecting said gauge for operation in response to the differential of signals delivered through said translation systems, when said indicator is disconnected from both systems.

8. Apparatus for density gauging the material of a test object comprising a pair of ray sensitive detector elements disposed in position the one to receive penetrating rays from a suitable ray source after being screened through the test object, and the other in position to receive rays from said source unscreened by said test object, measuring means for determining the impedance of said detectors, a translation system including an electron flow valve operatively associated with each detector, means to operate each of said translation systems in accordance with the measured impedance of its corresponding detector, a density responsive gauge, an impedance responsive gauge, a pair of gauge operating electron flow valves for each of said gauges, each pair of gauge operating valves being connected to drive its associated gauge, and selector switch means selectively operable to interconnect the control grids of said density responsive gauge operating valves for simultaneous operation, each respectively by its corresponding translation system, and to connect said impedance responsive gauge operating valves for operation by either of said systems.

9. Apparatus for density gauging the material of a test object comprising a pair of ray sensitive detector elements disposed in position the one to receive penetrating rays from a suitable ray source after being screened through the test object, and the other in position to receive rays from said source unscreened by said test object, measuring means for determining the impedance of said detectors, a translation system including an electron flow valve operatively associated with each detector, means to operate each of said translation systems in accordance with the measured impedance of its corresponding detector, a density responsive gauge, an impedance responsive gauge, a pair of gauge operating electron flow valves for each of said gauges, a double-pole, double-throw selector switch having movable switch contacts each connected to ground through resistance means, and electrically interconnected diagonally opposed stationary contact pairs connected respectively with said translation systems and with the control grids of said density responsive gauge operating valves, the control grid of one of said impedance responsive gauge operating valves being interconnected with one of said movable switch contacts, the grid of the other impedance responsive gauge operating valve being connected to ground through impedance means.

References Cited in the file of this patent

UNITED STATES PATENTS

| | | |
|---|---|---|
| 2,220,736 | Stockbarger et al. | Nov. 5, 1940 |
| 2,264,725 | Shoupp et al. | Dec. 2, 1941 |
| 2,469,206 | Rich | May 3, 1949 |
| 2,539,203 | Pohl | Jan. 23, 1951 |
| 2,549,402 | Vossberg | Apr. 17, 1951 |
| 2,586,303 | Clarke | Feb. 19, 1952 |
| 2,678,399 | Fay | May 11, 1954 |